United States Patent [19]

Knowlton et al.

[11] 4,155,005

[45] May 15, 1979

[54] FIBER OPTIC CONTROL SYSTEM

[75] Inventors: Keith L. Knowlton, Brimfield, Mass.; Robert F. Dowling, Jr., Pomfret Center, Conn.

[73] Assignee: Valtec Corporation, West Boylston, Mass.

[21] Appl. No.: 831,367

[22] Filed: Sep. 8, 1977

[51] Int. Cl.$^2$ .............................................. G02B 5/14
[52] U.S. Cl. ................................. 250/205; 250/227
[58] Field of Search ........................... 250/205, 227

[56] References Cited

U.S. PATENT DOCUMENTS

| | | | |
|---|---|---|---|
| 3,282,149 | 11/1966 | Shaw et al. | 250/205 X |
| 3,805,065 | 4/1974 | Williams | 250/227 X |
| 3,999,062 | 12/1976 | Demsky et al. | 250/227 |
| 3,999,074 | 12/1976 | Callaghan | 250/227 X |
| 4,013,342 | 3/1977 | Narodny | 250/227 X |
| 4,038,650 | 7/1977 | Evans et al. | 250/227 X |
| 4,045,667 | 8/1977 | Hanson | 250/227 X |
| 4,069,838 | 1/1978 | Hansel et al. | 250/227 X |
| 4,071,753 | 1/1978 | Fulenwider et al. | 250/227 |
| 4,087,684 | 5/1978 | Mutt | 250/227 X |
| 4,088,387 | 5/1978 | Lewis | 250/227 X |

*Primary Examiner*—James B. Mullins
*Attorney, Agent, or Firm*—Milton E. Kleinman

[57] ABSTRACT

A fiber optic control system with an electrically isolated control module that regulates the operation of a first and a second electrically operated device. A control module receives light on a fiber optic input cable from a control light source. An adjustable control in the control module provides a light of adjustable intensity from the control light source to a first and a second fiber optic output cable. The intensity of the light to the fiber optic output cables is adjusted by moving a reflective surface to vary the length of the light path. The reflective surface can also be rotated to terminate the light reflected to the fiber optic output cables. The first fiber optic output cable is adapted to convey light from the control module to a signal converter which controls the first electrically operated device in accordance with intensity of the light conveyed by the first fiber optic output cable to the signal converter. The second fiber optic output cable conveys light from the control module to a second signal converter which controls the second electrically operated device in accordance with the light conveyed by the second fiber optic output cable. One of the electrically operated devices is a variable intensity light source and the signal converter controls the amount of illumination emitted by the variable light source which is conveyed by a fiber optic illumination cable to a light emitting nozzle.

15 Claims, 6 Drawing Figures

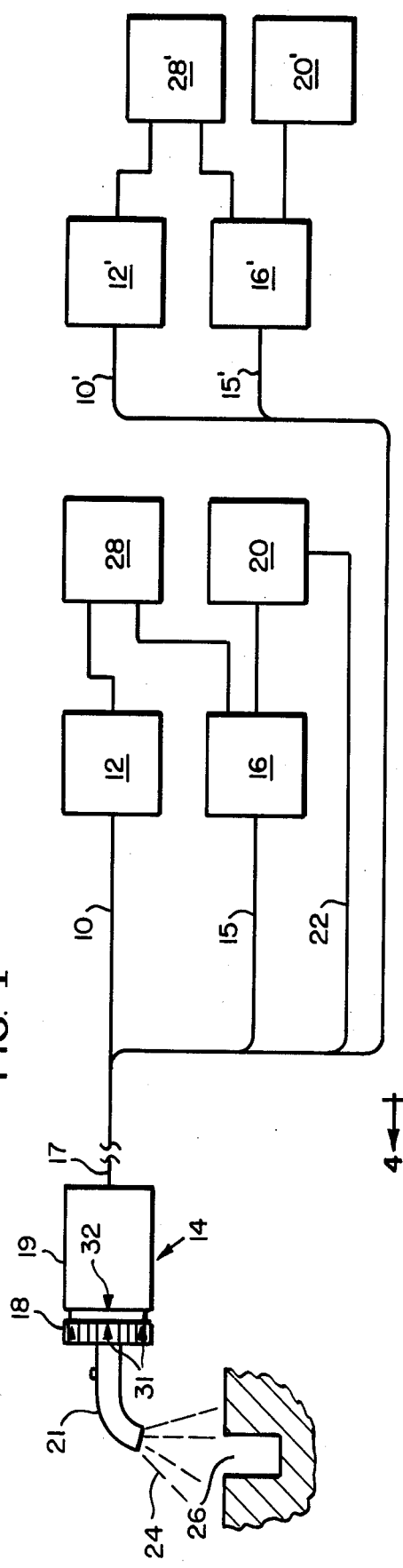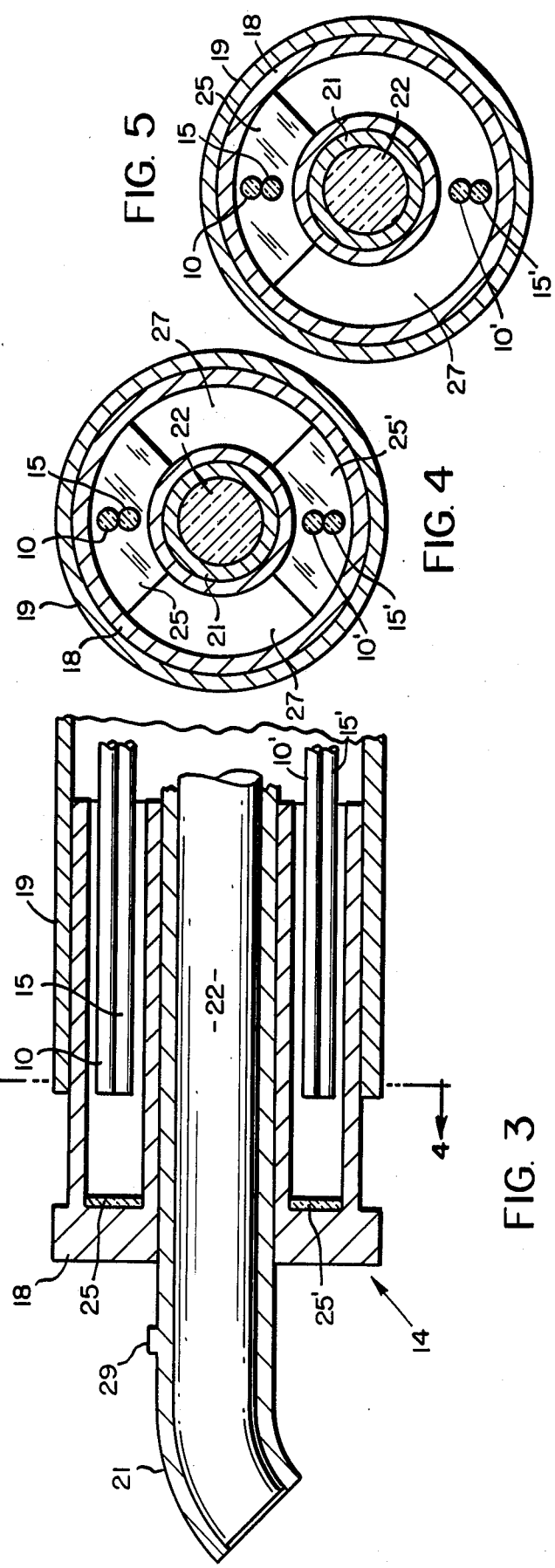

FIBER OPTIC CONTROL SYSTEM

FIELD OF THE INVENTION

The present invention relates to an isolated control system for electrically operated devices, and particularly to a fiber optic control system for such devices.

BACKGROUND OF THE INVENTION

Electrical devices are generally regulated or controlled by electro-mechanical means such as a potentiometer or a stepping switch. For example, the intensity of a lamp may be varied by turning a potentiometer and the speed of the motor may be varied by rotating a stepping switch. Frequently, it is desirable to physically separate the components by locating the control module, e.g., the potentiometer, the stepping switch or on/off switch at a distance from the operated device, e.g., the lamp or the motor. This may be done be extending several wires between the control module and the operated device and designing the circuitry to minimize the voltage loss along the connecting wires and to correct for this voltage loss in the regulating circuit.

Another method for separating a control module from an operated device is the use of a frequency transmitter and receiver similar to those used to automatically open and close garage doors. However, these radio control systems are costly and receivers tuned to the same frequency must be physically isolated so that a transmitted signal only controls its corresponding receiver system. In addition, there is always the risk that a receiver system can be operated by an unauthorized transmitter. Therefore, the method of merely extending wires between the control module and the operated device is frequently preferred because it is less expensive, it is less susceptible to misuse, there are no physical constraints on the proximity of one operated device to another, and it affords greater security and reliability in its use.

However, there are some applications where it may be undesirable to have electrically conducting wires. For example, such applications are frequently encountered by physicians and dentists when they are examining and treating body cavities having small work areas. An example of an attempt to solve this problem is shown in U.S. Pat. No. 3,758,951. This patent describes a dental device for illuminating an oral cavity by light transmitted on a fiber optic cable wherein the transmitted light is adjustable by a potentiometer in a control module that is located remote from the receptacle containing the light source. However, there may be some risk and attendant reluctance to use such a design if it is possible for a physician or dentist to transmit a shocking charge to themselves, or the patient in the event of a malfunction of the control module. Several ground fault detector circuits have been designed to interrupt the line voltage applied to electrical devices when a malfunction of the device creates leakage currents that could injure a patient. A casual perusal of ground fault detector circuits readily indicates that these circuits are both complex and costly. Furthermore, there is some concern if they would always operate in a timely manner to disconnect line power from a malfunctioning electrical device. In any event, these circuit devices reflect the seriousness and concern of subjecting a patient to the risk of receiving an electrical shock.

Similar prohibition against the use of a voltage carrying control module may be caused by environmental factors. For example, the potential hazard of combustible gases present in mines or explosive particles present in a laboratory or a paint spraying booth must be considered when equipment is designed and purchased for such environments. Advantages inherent in the present invention overcome the aforementioned risks and hazards and provide a control module for regulating electrical devices that can be utilized in such diverse and demanding applications with reduced risk at a reasonable cost.

SUMMARY OF THE INVENTION

There is provided according to the present invention a fiber optic control system for regulating the operation of and electrical device or for turning such a device on and off. In the described embodiment, the electrical device is a variable intensity light source adapted to convey light via a fiber optic cable to illuminate a small cavity that might be examined by a doctor or dentist. An electrically isolated control module is connected to a signal converter and operates in concert with the signal converter to control the power consumed by the light source thereby regulating the intensity of illumination emitted by the light source to illuminate the cavity. Several electrical devices such as a motor, compressor, stepping switches, etc., can readily be substituted for the light source and controlled by the signal converter. The signal converter is adapted to control these electrical devices by turning them on or off or by regulating their level and operation.

The control module includes a manually adjustable control for transmitting a variable amount of light via a fiber optic output cable to the signal converter circuit. The external device can be controlled without current carrying wires conveying electrical signals between the control module and the external device. The described control module can be used by the physician or dentist to illuminate a body cavity without incurring the risk of shock to the patient. Indeed, the control module may even be made part of any instrument or tool that may be used by the physician or dentist. Similarly, the control module could be located in any environment where electrically conducting external wires might present a hazard or be undesirable for other reasons. The signal converter controls the illumination of the light source in accordance with light conveyed by the fiber optic output cable and reflected on its photo-optic circuit. The circuitry described herein is designed to regulate the variable intensity light source in accordance with the reflected light conveyed from the control module.

The light transmitted by the control module on the fiber optic output cable connecting to the regulating circuit originates from a small light source such as a bulb or a light emitting diode (LED). A fiber optic input cable conveys the light from the small light source to the control module where an adjustable portion of the light is reflectively transferred to the fiber optic output cable connecting to the signal converter. The control module is thus isolated from any external electrical power or signal connection and attendant electrical currents. The necessity for electrical wires either entering or leaving the control module is eliminated. In addition, an alternate design configuration will be described where a self-contained power source such as a battery is placed in the control module to illuminate the LED which is also located in the control module. This design similarly eliminates current carrying electrical wires to an external power source or an electrical device.

Other attendant advantages and objects of the invention will be readily appreciated and better understood by reference to the following detailed description when considered with the accompanying diagrammatic representative drawings.

BRIEF DESCRIPTION OF THE DRAWINGS

FIG. 1 is a diagrammatic view of the variably operated electrical device regulated by an electrically isolated fiber optic control according to the present invention;

FIG. 3 is a cross-sectional of a portion of the control module illustrated in FIGS. 1 and 2;

FIG. 4 is a cross-sectional view taken along the line 4—4 of the control module shown in FIG. 3 that illustrates the reflective surface on the variable control;

FIG. 5 is the same view as FIG. 4 depicting an alternate embodiment of module; control modlue.

DETAILED DESCRIPTION OF THE INVENTION

Figure 2:
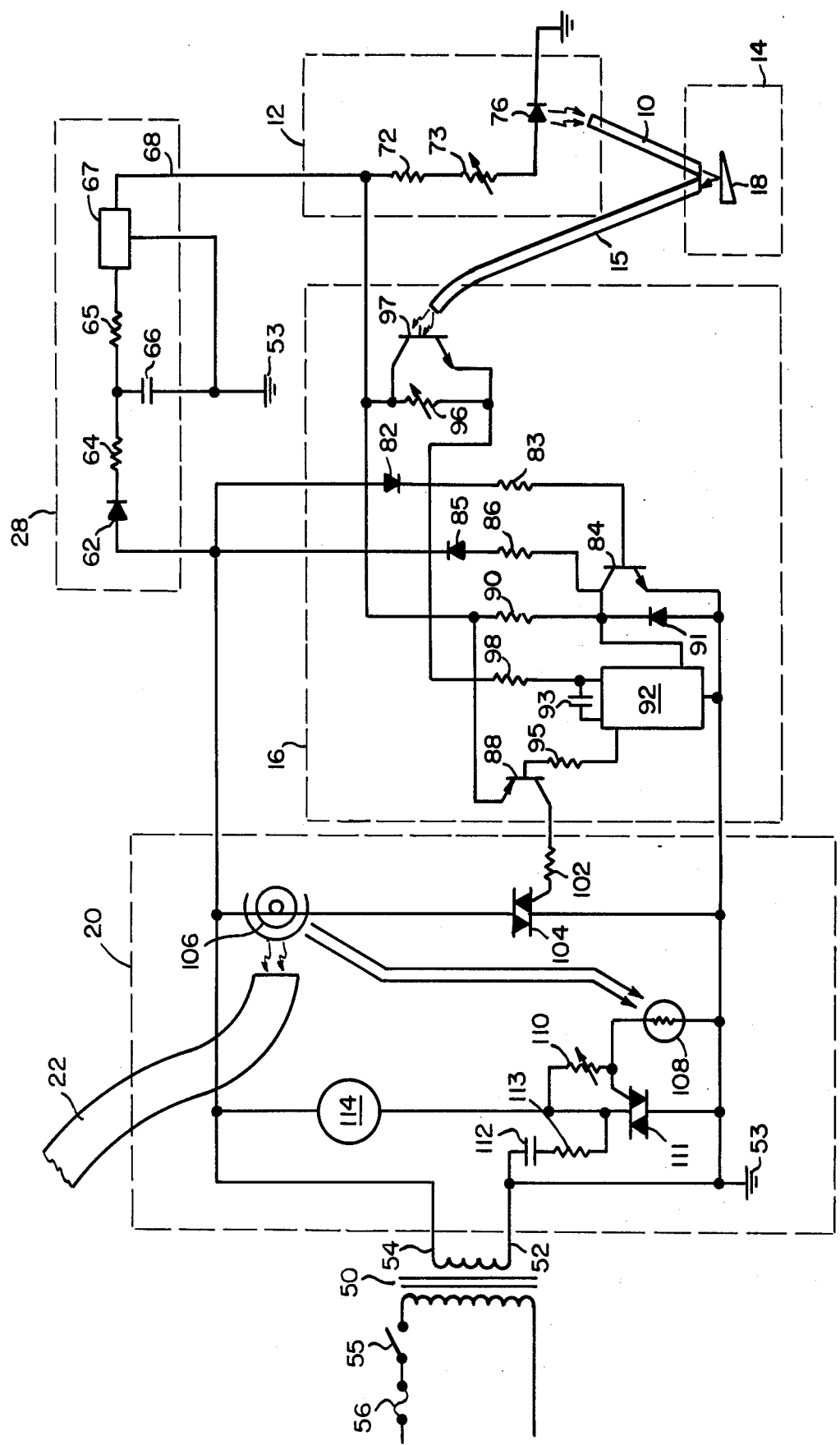
FIG. 2 is a schematic representation of the functional components shown in the block diagram of FIG. 1.

In order to provide a clear understanding of the invention, a preferred embodiment thereof will be considered from a number of viewpoints and in an order which will best reveal its novel features and advantages. First, an overall view of the variably operated electrical device regulated by an electrically isolated fiber optic control will be presented to clarify the functional context of the subject invention and to point out its intended functional advantages. Then, a detailed description of the circuit components designed for the fiber optic control and used to vary the light source will be provided. Next, the fiber optic control module will be more particularly described to illustrate the advantages of its design and its unique features. Finally, an alternate embodiment of the fiber optic control module and its connecting circuitry will be described.

Referring initially to FIG. 1, illustrated therein is a schematic in block diagram form of a fiber optic illumination system in which the fiber optic control of the present invention is employed. A fiber optic input cable 10 extends between a control light source 12 and a control module 14. A voltage stabilization circuit 28 is connected to the control light source 12. A fiber optic output cable 15 extends from the control module 14 to a signal converter 16. Fiber optic cables 10 and 15 are enclosed in a common cable assembly 17 connecting to the control module 14. The control module 14 includes a light output nozzle 21, a handle 19 for holding the control module, and a manually adjustable control 18. Markings 31 and 32 denote the position of the adjustable control 18 relative to the handle 19. The signal converter 16 is connected to an electrically operated device 20, in this instance a variable intensity light source. The illumination from the variable intensity light source is conveyed on a fiber optic illumination cable 22 partially enclosed in cable assembly 17 to the control module 14 which serves as an illuminated wand. Illumination 24 conveyed by fiber optic cable 22 is emitted at light output nozzle 21 of the control module 14 into a cavity 26.

The illumination from the control light source 12 is maintained stable from line voltage variations and other undesired fluctuations by the voltage stabilization circuit 28. The light emitted from the control light source 12 is conveyed by fiber optic input cable 10 to the control module 14. The adjustable control 18 is a manually variable control that provides a light of adjustable intensity to fiber optic output cable 15. The light of adjustable intensity provided to fiber optic output cable 15 may be varied or switched On and Off by the adjustable control 18. The illumination conveyed by fiber optic cable 15 to the signal converter 16 is some portion of the light conveyed on fiber optic cable 10 as determined by an adjustment of the control 18. The signal converter 16 converts the illumination conveyed on fiber optic cable 15 to an electrical control signal suitable to regulate the electrically operated device 20. In this embodiment, the electrically operated device is a variable intensity light source but an electric motor, stepping switch or any other device controllable by an electrical signal could be suitably controlled in place of the variable light source. The light produced by variable light source in device 20 is conveyed on fiber optic cable 22 to the control module 14 and disbursed at nozzle 21 into the cavity 26.

The illumination to the cavity 26 may be increased by moving the adjustable control 18 to increase the illumination from fiber optic input cable 10 reflectively transferred to fiber optic output cable 15. The signal converter 16 reacts to the increased illumination on fiber optic cable 15 by increasing its signal output to the electrically operated device 20. The intensity of the variable light source therein is thereby increased causing additional illumination to be conveyed by fiber optic cable 22 and disbursed at light output nozzle 21 into the cavity 26. Conversely, the illumination into the cavity 26 may be decreased by moving the adjustable control 18 in the opposite direction to decrease the illumination from fiber optic input cable 10 that is reflectively transferred to fiber optic output cable 15. The decreased illumination conveyed by fiber optic output cable 15 produces a corresponding reduction in the signal output from the signal converter 16 to the electrically operated device 20. The intensity of the variable light source therein is thereby decreased reducing the illumination carried by fiber optic cable 22 and disbursed at light output nozzle 21 into the cavity 26. In this manner, the illumination disbursed into cavity 26 is manually increased or decreased by moving the adjustable control 18 in a control module 14 that is isolated by fiber optic cables from any direct electrical connection to an external power source or control circuitry and their attendant electrical currents.

Still referring to FIG. 1, there is additionally shown connecting to cable assembly 17, a fiber optic input cable 10' and a fiber optic output cable 15'. The fiber optic input cable 10' extends from a control light source 12' and the fiber optic output cable 15' extends to a signal converter 16'. A voltage stabilization circuit 28' connects to control light source 12' and the signal converter 16', which connects to an electrically operated device 20'. These items are functionally equivalent to correspondingly numbered and previously described components in FIG. 1 with the exception that electrically operated device 20' may include a motor, a stepping switch or other device in place of the variable light source found in device 20 that provides light for the illumination cable 22. Electrically operated devices 20 and 20' are controlled from a common control module 14. It is evident that common circuitry could be adopted for corresponding numbered devices. For example, only a single voltage stabilization circuit 28 need be required to provide a stable voltage to both signal converters 16 and 16' and both control light sources 12 and 12'. In addition, a common control light source 12 could be used to provide light on fiber optic input cables 10 and 10' and even the two fiber optic input cables 10 and 10' between the control light source 12 and the control module 14 can be combined in a single fiber optic cable. However, depicting these items as separate functional entities with common numerical designations will clarify their system operation and facilitate their circuit descriptions.

Referring now to FIG. 2, therein is shown in greater detail a schematic representation of the functional components previously described with reference to FIG. 1. A power transformer 50 reduces line voltage to a convenient level and provides limited circuit isolation. Lead 52 from the secondary winding of transformer 50 is connected to a circuit ground 53, which is also shown elsewhere in the schematic. A power lead 54 from the other side of the secondary winding in transformer 50 applies power to the voltage stabilizer circuit 28, the signal converter 16 and the electrically operated device 20. An on-off switch 55 and a circuit overload protection fuse 56 are appropriately located in the input power line to the primary winding of transformer 50. The power lead 54 enters the voltage stabilizing circuit 28 and connects to a diode 62 in series with a T-shaped filter formed by resistors 64 and 65 and the capacitor 66 connected to the circuit ground 53. Resistor 65 connects to a voltage regulator 67 with an output lead 68 connecting to the control light source 12 and the signal converter 16. The lead 68 from the voltage stabilizer circuit 28 enters the control light source 12 and connects to a fixed resistor 72 in series with a variable resistor 73 and an LED 76. The fiber optic input cable 10 is positioned within the control light source 12 to receive illumination emitted from the LED 76.

An applied voltage from transformer 50 on lead 54 is also applied to the signal converter 16. This A.C. voltage is applied to a diode 82 in series with resistor 83 connecting to the base of transistor 84. The voltage on lead 54 is additionally applied to a diode 85 in series with a resistor 86 connecting to the collector of transistor 84. The diode 85 is in the opposing direction to diode 82 relative to the applied voltage. The output lead 68 from the voltage stabilization circuit 28 connects to an output transistor 88 of the signal converter 16; to a resistor 90 connecting in turn to transistor 84, diode 91 and a monostable multivibrator 92; and to a variable resistor 96 connected in parallel with a photo-detector 97 and connected in turn by a resistor 98 to the multivibrator 92. An external capacitor 93 connected between two terminals of the multivibrator 92 controls the range of output pulse widths obtainable from the multivibrator 92 by the variable resistive characteristics of the photo-detector 97. The output of multivibrator 92 is connected by a coupling resistor 95 to the output transistor 88.

The fiber optic output cable 15 from the control module 14 is positioned within the signal converter 16 so that light emitted from fiber optic cable 15 illuminates the base of photo-detector 97. Fiber optic cables 10 and 15 are shown to meet at the control module 14. The manually adjustable control 18 is shown schematically as a device variably reflecting illumination from fiber optic input cable 10 to fiber optic output cable 15.

A coupling resistor 102 connects output transistor 88 to the gate of a triac 104 in the electrically operated device 20. The triac 104 is in series with a variable light source 106 that is optically coupled to a photocell 108. The triac is equivalent to two SCR's connected in anti-parallel with a common gate. It provides switching of the light source 106 for either polarity of voltage applied from transformer 50 on leads 52 and 54 with its single gate electrode. Photocell 108 and a variable resistor 110 are connected as a voltage dividing network to the gate of a triac 111 connecting to the junction of photocell 108 and resistor 110. A capacitor 112 and resistor 113, serially connected to the junction of triac 111 and a fan 114, provide a noise suppression path to ground 53. Triac 111 is connected as a power switch for fan 114 between power leads 54 and 52. The fiber optic illumination cable 22 is positioned within the electrically operated device 20 to receive illumination from the light source 106.

The operation of the variable intensity light source regulated by an electrically isolated fiber optic control will now be more particularly described with reference to FIG. 2. The circuitry is activated by closing ON-OFF switch 55 applying the line voltage power to transformer 50 which steps down the applied voltage to typically 20 to 24 volts. The voltage from the transformer on power line 54 is supplied to the voltage stabilization circuit 28. The applied voltage is half-wave rectified by diode 62, filtered by the T-network formed by resistors 64, 65 and capacitor 66, and regulated by the voltage regulator 67 so that a constant reference voltage of nominally 5 volts D.C. is maintained at output lead 68 to the control light source 12 and to the signal converter 16. The reference voltage applied to the control light source 12 produces a fixed light output from LED 76 to the fiber optic input cable 10. The fixed resistor 72 and variable resistor 73 are chosen and adjusted to obtain a desired light output from the LED 76. The resistor 73 is adjusted to accommodate light output differences that may occur among different LED's used in the manufacture of this device and it also compensates for differences in the length of input and output cables 10 and 15.

The light emitted from the LED 76 is conveyed by fiber optic input cable 10 to the control module 14. The illumination reflected into fiber optic output cable 15 by the adjustable control 18 is some portion of the light on fiber optic input cable 10. The control 18 is manually adjusted to provide the desired amount of reflected light carried on output cable 15 to the photo-detector 97 in the signal converter 16.

For purposes of explaining the operation of this circuit, the photo-detector 97 can be considered to be a variable resistor, its resistance proportional to the amount of light conveyed by output cable 15. The resistive characeristics of the photo-detector 97 are inversely proportional to the amount of light illuminated on it by fiber optic output cable 15, i.e., as the illumination increases, the resistance decreases. The variable resistor 96 is initially set to establish a normal operating range and a desired circuit sensitivity over the range of illumination conveyed to photo-detector 97. The variable resistor 96 can also be set so that the absence of light conveyed to photo-detector 97 turns off the electrically operated device 20. Subsequent to setting of this resistor, resistor 96 and photo-detector 97 can be considered to be the circuit equivalent of one fixed resistor in parallel with one variable resistor. It is readily seen that the apparent fluctuations of this resistive circuit are substantially less than the resistive fluctuations of the photo-detector 97 alone and thus the net affect of this resistive circuit is to dampen or attenuate the apparent fluctuations of the resistive value of the photo-detector 97. This variable resistive combination in conjunction with resistor 98 and capacitor 93 form an RC time constant control input to the multivibrator 92 that determines the pulse width output from the multivibrator to output transistor 88. The resistive combination may typically range between 2,000 and 40,000 ohms.

The multivibrator 92 is triggered by the circuitry of transistor 84 which is synchronized to the frequency of the voltage applied to the transformer 50. More specifically, the positive voltage applied to the base of transistor 84 through diode 82 each half cycle of the applied voltage, allows the transistor 84 to assume a conductive state during this time interval. The diode 85 cuts off the transistor 84 during the negative going half wave of the applied voltage. The transistor 84 thus becomes conductive during a portion of a cycle of the applied line frequency. Each time the transistor 84 becomes conductive it applies a trigger pulse to the multivibrator 92. The duration of the pulse output from the multivibrator 92 following each trigger signal from transistor 84 is determined by the time constant associated with the RC circuit including the photo-detector 97. The length of time that the output pulse from the multivibrator 97 is present will be seen to be the time interval during which the variable light source 106 is illuminated. The intensity of the illumination from the light source 106 is proportional to the time duration of the signal output from the multivibrator 97.

The pulse output from the multivibrator 92 is applied to transistor 88 causing the triac 104 to conduct during the time duration of each pulse output from the multivibrator 92. When the triac 104 is conducting, power is applied to the light source 106. The triac 104 starts conduction each period of of the applied voltage frequency in synchronization with the triggering of multivibrator 92 by transistor 84 during the positive-going half-cycle of each period. The time interval during each period that power is applied to the light source 106 is determined by the RC time constant including the resistive value of photo-detector 97 that controls the pulse width of the multivibrator 92. The time interval that triac 104 is conductive during each period of the applied voltage freqeuncy directly affects the intensity of illumination from the light source 106. The duty cycle of the triac 104 is the amount of time that the triac is conductive as opposed to its idle or nonconductive time. The illumination from light source 106 increases as the duty cycle of triac 104 increases and, conversely, the illumination from light source 106 decreases as the duty cycle of triac 104 decreases. The duty cycle of the triac 104 correponds to the duty cycle of the multivibrator 92.

The illumination from the variable light source 106 is conveyed on fiber optic illumination cable 22 to the control module 14. In addition, the light source 106 is optically coupled to photocell 108. When the light source 106 illuminates the photocell 108, triac 111 is conductive, applying power to fan 114. It is thus seen that whenever the light source 106 is illuminated, the illumination causes power to be applied to fan 114 which in turn serves to cool the light source 106.

The operation of the fiber optic control system shown in FIG. 2 will now be described as the adjustable control 18 is manually adjusted to increase or decrease the reflected light on fiber optic output cable 15. The illumination conveyed by fiber optic illumination cable 22 is increased by moving the adjustable control 18 to increase the illumination from fiber optic input cable 10 reflectively transferred to fiber optic cable output 15. The increased illumination on photo-detector 97 decreases its effective resistance and the effective circuit resistance of the network comprised of resistor 96 and 98 and the photo-detector 97. The decreased RC time constant seen by the multivibrator 92 increases the duty cycle of the output signal from the multivibrator 92 to the output transistor 98. The duty cycle of the triac 104 is correspondingly increased causing the voltage applied to the light source 106 to be present for a longer time interval during each cycle, thereby increasing the illumination emitted by the light source 106 and conveyed on the illumination cable 22. Conversely, the illumination conveyed by fiber optic illumination cable 22 is decreased by moving the adjustable control 18 to decrease the illumination from fiber optic input cable 10 reflectively transferred to fiber optic cable 15. The decreased illumination on photo-detector 97 increases the effective circuit resistance of the network and increases the RC time constant seen by the mutivibrator 92, thereby decreasing the duty cycle of the output signal from the multivibrator 92 to the output transistor 88. The duty cycle of the triac 104 is correspondingly decreased causing the voltage applied to the light source 106 to be present for a shorter time interval during each cycle, thereby decreasing the illumination emitted by the light source 106 and conveyed on the illumination cable 22. The resistor 96 can be set so that in the absence of illumination on photo-detector 97, the RC time constant seen by the multivibrator 92 is sufficiently increased that its duty cycle is effectively deceased to the point where the light source 106 is turned off. When the illumination is turned On or Off by the adjustable control 18, the circuitry perceives this as an increase or decrease of illumination, respectively, and reacts accordingly as described above. A motor, stepping switch or similar device in the electrically operated device 20' shown in FIG. 1 can be regulated in a similar manner with equivalent circuitry.

FIG. 3 is an exploded cross-sectional view of a portion of the control module 14 drawn to a variable scale to facilitate its description. Although the control module 14 may appear to be a large cumbersome device in FIG. 3, it may typically be fabricated in an elongated shape only slightly wider than a mechanical pencil that can easily be held in a hand. The control module is seen to include the fiber optic illumination cable 22 and fiber optic input cables 10, 10' paired with fiber optic output cables 15, 15' respectively. The light output nozzle 21 is seen to extend into the control module 14 and provide support for the adjustable control 18 that is in the form of a friction fit slidable collar on the nozzle 21. A stop 29 on the nozzle 21 limits the movement of the adjustable control 18 along the nozzle. The adjustable control 14 has reflective surfaces 25 and 25' adopted to reflect light from the fiber optic input cables 10 and 10' to the fiber optic output cables 15 and 15' respectively. The handle 19 encloses the fiber optic cables and a portion of the adjustable control 18. The handle 19 is connected to the nozzle 21 extending into the module 14 with supporting ribs (not shown) spaced between the fiber optic cables 10, 15 and 10' and 15'. However, there are several obvious and equivalent structural connections for achieving the described movement of the reflective surfaces 25, 25' relative to the fiber optic cables. The adjustable control 18 is movable along the nozzle 21 to vary the distance between the reflective surfaces 25, 25' and the ends of fiber optic cables 10, 15 and 10', 15', respectively. This movement along an axis parallel to the tubular axis of the fiber optic output cables 15, 15' at their ends simultaneously and correspondingly varies the illumination reflected to the fiber optic output cables 15, 15'. Specifically, moving the adjustable control 18 toward the light outlet of nozzle 21 increases the distance between reflective surfaces 25, 25' and the ends of the fiber optic cables and decreases the illumination from fiber optic input cables 10, 10' reflected onto fiber optic output cables 15, 15', respectively. Conversely, moving the adjustable control 18 along the control module 14 in the opposite direction decreases the distance between the reflective surfaces 25, 25' and the ends of the fiber optic cables and increases the illumination from fiber optic input cables 10, 10' reflected onto fiber optic output cables 15, 15', respectively. In this manner, the illumination reflected onto fiber optic output cables 15, 15' is varied by sliding the adjustable control 18 along the length of the control module 14. The movement of the adjustable control 18 along the nozzle 21 is limited by the stop 29 and the end of the handle 19 so that a continuously variable illumination is reflected onto fiber optic output cables 15, 15' as the adjustable control is moved from one limit to the other along an axis parallel to the tubular axis of the fiber optic output cable at its end.

Referring now to FIG. 4, there is shown a cross-sectional view of a control module 14 along the line 4—4 shown in FIG. 3. The fiber optic illumination cable 22 is encircled by the nozzle 21. Reflective surfaces 25 and 25' are shown in front of fiber optic cables 10, 15 and 10', 15' respectively. The reflective surfaces 25, 25' cover only a portion of the surface on the manually adjustable control 18, the remaining surface area being non-reflective (or light absorbing) surfaces 27. As the adjustable control 18 is rotated about the nozzle 21, the reflective surfaces 25, 25' in front of the fiber optic cables 10, 15 and 10', 15' are replaced by non-reflective surfaces 27. Referring now to both FIGS. 3 and 4, it should be noted that the control module 14 has two degrees of control. In the first degree, the illumination reflected onto fiber optic cables 15, 15' is continuously variable by sliding the adjustable control 18 along the length of the control module 14. In the second degree of control, the light reflected onto fiber optic cables 15, 15' can be shuttered, i.e., turned off or on, by rotating the adjustable control 18 about the control module 14. Shuttering of the light reflected onto fiber optic output cables 15, 15' effectively shutters the electrically operated devices 20, 20'. Therefore, the adjustable control 18 may be operated by first adjusting the illumination reflected onto fiber optic cables 15, 15' to a desired level by sliding the adjustable control 18 along the control module 14. Then the electrically operated devices 20, 20' shown in FIG. 1 can be turned off by rotating the adjustable control 18 about the nozzle 21 to terminate the illumination reflected onto fiber optic output cable 15, 15'. Subsequently, the electrically operated devices 20, 20' can be turned on to the previously established level of operation by merely rotating the adjustable control 18 about the nozzle 21 so that the reflected surfaces are once again in front of fiber optic cables 10, 10', 15, 15'. Since the distance between the ends of the fiber optic cables and the reflective surfaces is substantially maintained during the process of turning the devices 20, 20' off and then on, the illumination reflected onto fiber optic output cables 15, 15' is substantially the same as before and the electrically operated devices 20, 20' are turned on at the previously established operating levels. At this point, it is appropriate to note that as reflective surface 25 is positioned relative to output cable 15, reflective surface 25' is similarly positioned relative to output cable 15 and thus both electrically operated devices are concurrently regulated in concert by the same adjustable control 18. Therefore, the intensity of illumination 24 from light output nozzle 21 is a visual indication of the operating level of device 20'. Here again, it should be noted that items with common numerical designations are readily combined in the design of this fiber optic control system. They are shown as separate items with primed numbers to clarify the description of the invention and to facilitate its understanding. For example, the reflective areas 25 and 25' can be merged into a single reflective surface, fiber optic input cables 10 and 10' can be combined in a single cable from a single light source, and fiber optic output cables 15 and 15' can be included in the same fiber optic output bundle.

Referring now to FIG. 5, there is shown with the same view as FIG. 4, an alternate embodiment of the control module 14. A description of the components in this figure corresponds with the prior description of this view in FIG. 4 for correspondingly numbered components. In this embodiment, a single reflective surface is provided to either reflect light from fiber optic input cable 10 to fiber optic output cable 15 or, alternately, to reflect light from fiber optic input cable 10' to fiber optic output cable 15'. The pairs of fiber optic cables 10, 15 and 10', 15' are spaced apart so that the reflected surface 25 can only be in front of one pair of fiber optic cables at a time. This insures that only one of the devices 20 or 20' shown in FIG. 1 can be activated at the same time by the light reflected on fiber optic output cables 15 or 15'. It should be noted that the level of operation of the device 20 or 20' is determined by moving the adjustable control along nozzle 21 as previously described and one of the electrically operated devices 20 or 20' is selected by rotating the adjustable control 18 about the nozzle 21. The distance between the ends of the fiber optic cables and the reflective surface 25 is substantially maintained as the adjustable control 18 is rotated to select device 20 or 20'. These characteristics enable the following mode of operation. Consider that the device 20 is operating at a selected operating level determined by the illumination reflected on fiber optic output cable 15. The adjustable control 18 is rotated so that the non-reflective surface 27 is positioned in front of fiber optic cables 10, 15 and there is no illumination reflected onto fiber optic cable 15 to cause device 20 to be operable. The reflective surface 25 has been positioned in front of fiber optic cables 10', 15' and the illumination reflected onto fiber optic cable 15' is substantially the same as previously reflected onto fiber optic cable 15. The device 20' is now operable at a level corresponding to the prior operable level of device 20 for the same intensity of illumination reflected onto its corresponding fiber optic output cable. In this manner, an operator can alternately select one or the other of the available devices 20 or 20' and cause the selected device to function at an operating level corresponding to the operating level of the prior selected device. The corresponding operating levels are predetermined by adjustment of the resistor 96 shown in FIG. 2 and by adjustment of a corresponding resistor in signal converter 16'.

Figure 6:
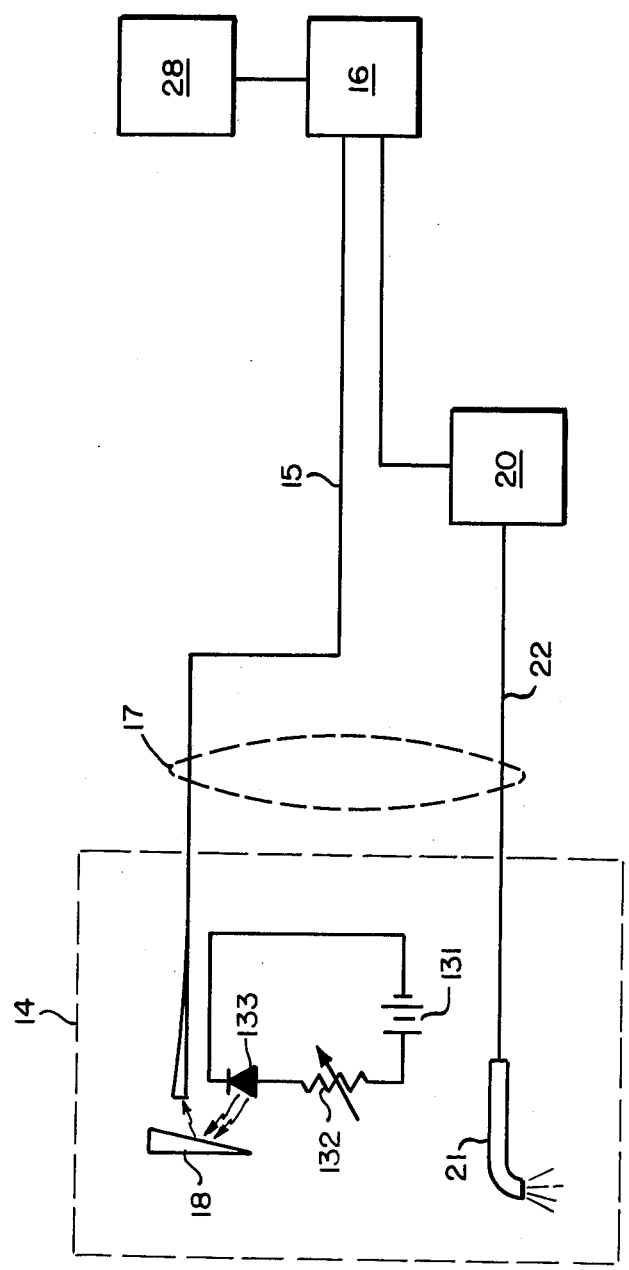
FIG. 6 is an alternate embodiment to the control module excitation circuitry of the present invention.

Referring now to FIG. 6, there is shown an alternate embodiment of the control module excitation circuitry depicted in the context of the diagrammatic view of FIG. 1. The signal converter 16 is shown connecting to the voltage stabilization circuit 28 and the electrically operated device 20 as previously described with reference to FIGS. 1 and 2. The fiber optic output cable 15 conveys reflected light from the control module 14 to the signal converter 16. Illumination from the electrically operated device 20 is conveyed on fiber optic illumination cable 22 to the control module 14 and emitted at nozzle 15 as previously described. Within the control module 14, there has been added an isolated power source 131, typically a battery, a variable resistor 132 in series with the battery and an LED 133 completing the battery circuit. The LED 133 is positioned so that its emitted light can be reflected by the adjustable control 18 to the fiber optic output cable 15. The variable resistor 132 is adjusted so the current from power source 131 to the LED 133 produces a desired range of illumination to be reflectively conveyed by fiber optic cable 15 to the signal converter 16 to control the electrically operated device 20 as previously described with reference to FIG. 2. The control module 14 is electrically isolated from its related units and there are no electrically conductive wires connecting to the control module 14.

From the above description, it is apparent that there is thus provided fiber optic control equipment of the character described possessing the particular features of advantage before enumerated as desirable, but which is obviously susceptible or modification in its form, proportions, detailed construction and arrangement of parts without departing from the principles involved or sacrificing its chief advantages. For example, the light of adjustable intensity provided to the fiber optic output cable may be adjusted by passing it through a variable orifice or using other photo-optic methods to variably attenuate the light to the fiber optic output cable rather than varying the distance of the light traveled from the light source to the output cable by moving the reflective surface as described herein. In addition, photocells can be used in place of photo-detectors and other circuit substitutions or modifications can readily be made. However, it is understood that the invention is not limited to the specific features shown, but the means and construction disclosed herein comprise the preferred form of several modes of putting the invention into effect, and the invention is, therefore, claimed in any of its forms or modifications within the legitimate and valid scope of the appended claims.

What is claimed is:

1. A fiber optic control system comprising:
    an electrically operated device;
    a control light source;
    a signal converter adapted to control said electrically operated device in accordance with the intensity of light from said control light source conveyed to said signal converter;
    a control module receiving illumination from said control light source;
    a fiber optic output cable adapted to convey light from said control module to said signal converter;
    an adjustable control means disposed in said control module for varying the intensity of light from said control light source conveyed by said fiber optic output cable to said signal converter, said signal converter controlling said electrically operated device to effect desired variations in the operation of said electrically operated device in response to the operation of said adjustable control means adjusting the intensity of light conveyed by said fiber optic output cable to said signal converter; and
    said adjustable control means includes means for a first and second degree of control, said means for a first degree of control varies the intensity of light conveyed by said fiber optic output cable to effect desired variations in the operation of said electrically operated device, and said means for a second degree of control shutters the light level selected with said means for a first degree of control onto said fiber optic output cable to turn said electrically operated device on and off.

2. The fiber optic control system of claim 1 wherein said adjustable control means shutters the light to said fiber optic output cable to turn said electrically operated device on with said adjustable control means preset to obtain a predetermined level of operation for said electrically operated device.

3. The fiber optic control system of claim 1 including a reflective surface in said adjustable control means to reflectively transfer light from said control light source to said fiber optic output cable, wherein the distance from said reflective surface to said fiber optic output cable is varied to correspondingly vary the light of adjustable intensity conveyed to said signal converter.

4. The fiber optic control system of claim 1 including a reflective surface disposed in said adjustable control means to reflectively transfer light from said control light source to said fiber optic output cable, said first degree of control varying the reflective distance from said reflective surface to said fiber optic output cable and said second degree of control moving said reflective surface from the light path to said fiber optic output cable.

5. A fiber optic control system comprising:
    a first and a second electrically operated device;
    a control light source;
    a first signal converter adapted to control said first electrically operated device in accordance with the intensity of light from said control light source conveyed to said first signal converter;
    a second signal converter adapted to control said second electrically operated device in accordance with the intensity of light from said control light source conveyed to said second signal converter;
    a control module receiving illumination from said control light source;
    a first and a second fiber optic output cable adapted to convey light from said control module to said respective first and second signal converters;
    an adjustable control means disposed in said control module for varying the intensity of light from said control light source to said first and second fiber optic output cables, said adjustable control means providing a light of adjustable intensity from said control light source on said first fiber optic output cable to said first signal converter, said first electrically operated device controlled by said first signal converter in accordance with the intensity of light conveyed by said first fiber optic output cable, and said adjustable control means providing a light of adjustable intensity from said control light source to said second fiber optic output cable to said second signal converter, said second electrically operated device controlled by said second signal converter in accordance with the intensity of light transferred by said second fiber optic output cable; and said adjustable control means includes means for a first and a second degree of control, said means for a first degree of control provides a common control for adjusting the intensity of light onto said first fiber optic output cable and for adjusting a corresponding intensity of light onto said second fiber optic output cable, and said means for a second degree of control provides a common control for shuttering light to said first and second fiber optic output cables.

6. The fiber optic control system of claim 5 wherein said means for a second degree of control shutters the light from said control light source so that only a selected one of said first and second fiber optic output cables receives a corresponding intensity of light adjusted by said means for a first degree of control from said control light source.

7. A fiber optic control module comprising:
a control light source,
a fiber optic output cable with an end in said control module for receiving illumination,
an adjustable control adapted to vary the intensity of light transferred from said light source to the end of said fiber optic output cable, said adjustable control providing light of adjustable intensity from said control light source to said fiber optic output cable, and said adjustable control means includes means for a first and a second degree of control in said adjustable control, said means for a first degree of control providing a light of adjustable intensity onto said fiber optic output cable, and said means for a second degree of control shuttering the light level selected with said means for a first degree of control onto said fiber optic output cable.

8. The fiber optic control module of 7 including a reflective surface on said adjustable control to reflect an adjustable intensity of light to said fiber optic output cable, wherein the illumination reflected from said light source to said fiber optic output cable is adjusted by varying the distance between said reflective surface and the end of said fiber optic output cable.

9. The fiber optic control module of claim 8 wherein the illumination reflected from said light source to said fiber optic output cable is adjusted by varying the distance of the light path between said control light source and the end of said fiber optic output cable.

10. The fiber optic control of claim 7 wherein said control module is fabricated in an elongated shape, and said means for a first degree of control of said adjustable control is obtained by longitudinal movement of said adjustable control means along the length of said control module and said means for a second degree of control is obtained by rotating said adjustable control about said control module.

11. A fiber optic control module comprising,
a control light source,
a first and a second fiber optic output cable with an end disposed in said control module for receiving illumination,
an adjustable control adapted to vary the intensity of light transferred from said light source to the end of said first fiber optic output cable, said adjustable control further adapted to vary the intensity of light transferred from said light to said second fiber optic output cable and the adjustment of said adjustable control to vary the light to one of said first and second fiber optic output cables correspondingly varies the level of light transferable to the other of said first and second fiber optic output cables.

12. A fiber optic control module of claim 11 wherein said control light source includes a first and a second fiber optic input cable with an end disposed in said control module for emitting light, said first fiber optic input cable emitting light transferred by said adjustable control to said first fiber optic output cable, and said second fiber optic input cable emitting light transferred by said adjustable control to said second fiber optic output cable, and said adjustable control concurrently varies the intensity of light transferable to said first and second fiber optic output cables from the corresponding one of said first and second fiber optic input cables.

13. The fiber optic control module of claim 12 including a reflective surface on said adjustable control and the intensity of light from said control light source to said first and second fiber optic output cables is varied by varying the distance from said reflective surface to the ends of said first and second fiber optic output cables.

14. The fiber optic control module of claim 12 including a reflective surface on said adjustable control, said reflective surface movable through the light path from said control light source to said first and second fiber optic output cables to shutter the light to said first and second fiber optic output cables.

15. The fiber optic control system of claim 15 wherein said adjustable control is additionally adapted to transfer light from said control light source to a selected one of said first and second fiber optic output cables concurrently determines that no light is transferred to the other of said first and second fiber optic output cables, and the intensity of light transferred to the selected fiber optic output cable corresponds to the intensity of light selectively transferable to the other fiber optic output cable.

* * * * *